United States Patent [19]

Johnson

[11] Patent Number: 5,210,841
[45] Date of Patent: May 11, 1993

[54] EXTERNAL MEMORY ACCESSING SYSTEM

[75] Inventor: William M. Johnson, Austin, Tex.

[73] Assignee: Advanced Micro Devices, Inc., Sunnyvale, Calif.

[21] Appl. No.: 472,099

[22] Filed: Jan. 30, 1990

[51] Int. Cl.$^5$ .................. G06F 12/00; G06F 12/10; G06F 9/34

[52] U.S. Cl. .................. 395/400; 395/425; 364/DIG. 1

[58] Field of Search .............. 395/400, 425, 375, 800; 364/200 MS File

[56] References Cited

U.S. PATENT DOCUMENTS

| | | | |
|---|---|---|---|
| 4,734,852 | 3/1988 | Johnson et al. | 395/250 |
| 4,777,587 | 10/1988 | Case et al. | 395/800 |
| 4,926,323 | 5/1990 | Baror et al. | 395/375 |
| 5,041,968 | 8/1991 | Yamaguchi | 395/725 |
| 5,117,493 | 5/1992 | Jensen | 395/425 |

Primary Examiner—Joseph L. Dixon
Assistant Examiner—Michael A. Whitfield
Attorney, Agent, or Firm—Foley & Lardner

[57] ABSTRACT

A new and improved external memory accessing system for use in a microprocessor. The system includes a physical address cache for storing a plurality of entries including register numbers and corresponding translated external memory address locations which were used for execution of previous load instructions. The system further includes means responsive to a current load instruction for determining if the address of the register specified in the load instruction is within the physical address cache and means for conveying to the external memory, at the beginning of the execution stage of the load instruction, a previously translated external memory physical address corresponding to a specified register stored in the physical address cache. Also disclosed is a new and improved address generator for generating a new translated external memory physical address which is conveyed to the external memory and to the physical address cache for updating the physical address cache.

20 Claims, 1 Drawing Sheet

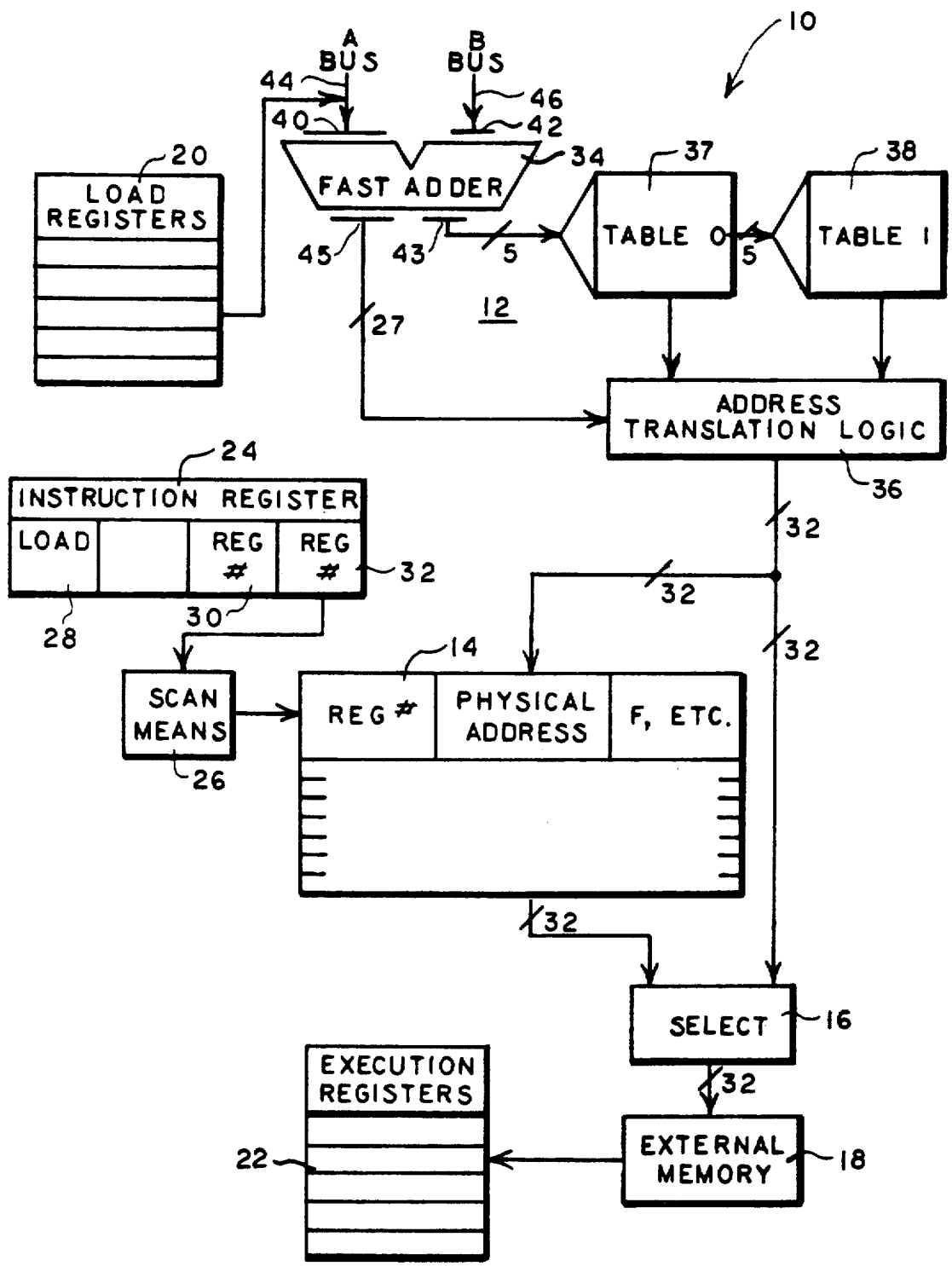

EXTERNAL MEMORY ACCESSING SYSTEM

BACKGROUND OF THE INVENTION

The present invention generally relates to an improved external memory accessing system and more particularly to an external memory accessing system for a reduced instruction set (RISC) processor which employs register-indirect addressing and external memory.

Microprocessors are well known in the art. One type of microprocessor is a reduced instruction set (RISC) processor having a pipelined architecture. Such processors process serial instructions through a series of stages including, for example, a fetch stage, a decode stage, an execute stage, and a write-back stage. Such processors operate at very high speeds and due to their pipelined architecture, are capable of efficiently executing instructions with a minimum of hardware.

In such processors, each instruction is processed through the aforementioned stages. Hence, a first instruction may be in the decode stage while a second or next instruction is being fetched. In the next cycle, both instructions move down the pipeline by one stage wherein the first instruction is now being executed while the second instruction is being decoded.

When a processor of this type is called upon by an instruction to perform an execution upon data, it does so by acting upon the operands contained in a register file. Hence, in order to execute such instructions, it is first necessary for the processor to load the data or operands into register file. As a result, load instructions are common in such processors for this purpose.

In order to load data into a register file from an external memory, the external memory must first be accessed. In order to access external memory, prior art processors must first compute the address of the external memory and then translate the address into a physical address of the external memory. This process takes time and can adversely affect the efficiency of the processor. Other processors compute the external memory address before the load instruction and store the address for later use. However, such processors still must translate the address after the load instruction. While this type of processor exhibits improvement over the first-mentioned processor, improvement on this process is still desireable.

A high-performance processor requires low latency access to an external memory in order to achieve its potential performance. Preferably, the memory should supply an item of data within one cycle after the processor requests it. The term "zero-wait-state" is commonly applied to a memory system with this capability. This refers to the fact that the processor does not have to wait for a memory access to complete, because the access is always completed quickly.

Unfortunately, the technical requirements on a zero-wait-state memory make it very difficult and expensive to implement. This is particularly true at the very high operating frequencies that characterize RISC processors. The combined requirements for zero-wait-state memory and very high operating frequencies present a severe impediment to the performance of these types of processors.

The present invention overcomes the aforementioned problems with respect to accessing an external memory. The present invention, while using a one-wait-state memory system is capable of achieving the performance of a zero-wait-state memory.

SUMMARY OF THE INVENTION

The present invention provides a new and improved system for efficiently accessing the data stored in an external memory and providing the data to a register to facilitate execution upon the data. The external memory accessing system is adapted for use in a processor of the type which processes instructions in serial stages including a fetch stage, a decode stage, an execute stage, and a write-back stage, and which includes an external memory for storing data to be executed upon, wherein the external memory includes a plurality of storage locations with each location having a unique physical storage address, wherein the processor further includes a first plurality of registers, each one of the first plurality of registers having a unique address and being arranged for storing an untranslated address corresponding to one of the external memory locations, and a second plurality of registers, each one of the second plurality of registers having a unique address and being arranged for storing data to be executed on by the processor. The addresses stored in the first plurality of registers require translation to the physical external memory location addresses to permit the external memory locations to be accessed. The external memory accessing system is arranged to respond to a currently fetched load instruction including the address of one of the first plurality of registers and includes a physical address cache for storing a plurality of entries including the addresses of the first plurality of registers and the corresponding translated external memory address locations for those ones of the first plurality of registers which were used for the execution of previous load instructions, means responsive to the currently fetched load instruction for determining, during the decode stage of the load instruction, if the address of the one of the first plurality of registers contained in the currently fetched load instruction is stored in the physical address cache, and means for conveying to the external memory, at the beginning of the execution stage of the load instruction, the previously translated physical address of the memory location corresponding to the address of the one of the first plurality of registers if the address of the one of the first plurality of registers is contained in the physical address cache.

The present invention further provides an address generator for use in a processor for generating a multiple-bit translated external memory physical address responsive to a base address and an offset address. The address generator includes a plurality of tables, each table containing a plurality of external memory physical addresses and computing means for arithmetically processing the base address and the offset address to generate a multiple-bit virtual address. The computing means is arranged to generate the multiple-bit virtual address one bit at a time and to provide the tables with a given number of the bits first generated. The tables are responsive to the first generated bits to derive from each table one potential translated physical address while the computing means generates the other bits of the multiple-bit virtual address. The address generator further includes translation means coupled to the computing means and to each of the tables for comparing the generated multiple-bit virtual address to the potential translated physical addresses to determine which one of the potential translated physical addresses is the multiple-bit translated external memory physical address.

BRIEF DESCRIPTION OF THE DRAWINGS

The features of the present invention believed to be novel are set forth with particularity in the appended claims. The invention, together with further advantages and objects thereof, may best be understood by making reference to the following description taken in conjunction with the accompanying drawing, in the sole figure of which like reference characters identify identical elements, and wherein the sole figure is a schematic block diagram of an external memory accessing system embodying the present invention.

DESCRIPTION OF THE PREFERRED EMBODIMENT

Referring now to the sole figure, the sole figure illustrates, in schematic block diagram form, an external memory accessing system 10 embodying the present invention. The external memory accessing system generally includes an address generator 12, a physical address cache 14, a select circuit 16, and a scan means 26. The external memory accessing system 10 is adapted to access physical memory locations within an external memory 18 for a microprocessor including a first plurality of registers 20, herein referred to as load registers, a second plurality of registers 22, herein referred to as execution registers, and an instruction register 24 which includes the multiple-bit instructions to be executed by the processor. Although illustrated separately for purposes of explanation, load registers 20 and execution registers 22 could be one set of registers as will be appreciated by those skilled in the art. The external memory accessing system 10 responds to load instructions for accessing a specified physical memory location in the external memory 18 by conveying to the external memory, at the beginning of the execution stage of a load instruction, a translated physical address of the memory location to be accessed in the external memory. Once accessed, the external memory can then transfer the data stored in the particular physical memory location to one of the execution registers 22 as operand data to permit the processor to act upon the operand data.

One such load instruction is illustrated in the instruction register 24. The load instruction includes a first set of bits 28 which identify the instruction as a load instruction, a second set of bit 30 which identify the execution register in which the operand data is to be loaded into, and a third set of bits 32 which identifies the load register which contains an untranslated memory address corresponding to the physical address location of the external memory 18 to be accessed. The load instruction may include further bits of information such as function information which are not important to the present invention. As will be seen hereinafter, the system 10 responds to the load instruction by accessing the physical memory location of the external memory 18 corresponding to the address contained in the register identified by the third set of bits 32 so that the operand data may be transferred to the execution register identified by the second set of bits 30.

The address generator 12 includes an adder 34, an address translation logic 36, and a plurality of tables 37 and 38. The adder 34 includes a first input 40 and a second input 42. The first input 40 is coupled to a bus A44 for receiving a base address and input 42 is coupled to another bus B46 for receiving an offset address. The address generator 12 generates a translated external memory physical address responsive to receipt of the base address at input 40 and the offset address at input 42. As is well known in the art, such address generation can be provided in response to an add instruction wherein the offset address is added to the base address. The offset may represent a positive or negative number. The address generator therefore generates a translated external memory physical address when a new external memory physical address is required.

The tables 37 and 38 each include a plurality of external memory physical addresses. As the adder 34 computes the new external memory virtual address, it provides the tables 37 and 38 with a given number of its first generated bits at output 43 referred to herein as the table entry select bits. In accordance with the preferred embodiment, the adder 34 provides the tables 37 and 38 with five bits of the first bits that it generates. In response to receiving the entry select bits by the adder 34, each of the tables 37 and 38 provides a potential translated external memory physical address to the address translation logic. Since the system 10 includes two such tables, the address translation logic is provided with two such potential translated external memory physical addresses. While the tables 37 and 38 are accessed and provide the potential address to the address translation logic 36, the adder 34, in parallel, generates the remaining bits of the external memory virtual address. In accordance with this preferred embodiment, the complete external memory virtual address includes 32 bits. The remaining bits are provided at output 45.

After the adder has computed all of the bits of the external memory virtual address, the address translation logic then compares the generated address to the two potential translated external memory physical addresses. In doing so, it selects the potential translated external memory physical address which corresponds to the address generated by the adder 34 and selects that address as the translated external memory physical address. It then conveys the translated external memory physical address to the select circuit 16. It also conveys the translated address to the physical address cache 14 which will be described in detail hereinafter.

If a new address is not required to be generated by the address generator, in other words, the untranslated address resides in one of the load registers 20, the adder 34 will pass the address from the load register to the address translation logic without acting upon that address. The untranslated address is then translated in the translation logic which then provides the translated external memory physical address to the select circuit 16.

The physical address cache 14 is a fully-associative cache which is accessed by absolute register-numbers. It includes a plurality of entries including load register numbers and corresponding translated external memory physical addresses which were previously translated in response to previous load instructions. When the address generator 12 generates a new translated external memory physical address, it conveys that address to the cache 14 for the purpose of updating the cache. The cache also stores the corresponding load register number. The cache 14 may also be updated by the translated external memory physical address resulting from the pass-through of an untranslated address from one of the load registers 20 through the adder 34 and which was then translated by the translation logic 36.

If the processor fetches a load instruction which requires the external memory 18 to be accessed, the scan means 26, during the decode stage of the load instruction, scans the physical address cache 14 for the load register number contained in the third set of bits 32 of the load instruction. If the scan means 26 locates the register number identified in the load instruction, it will cause the physical address cache 14 to convey the previously translated external memory physical address to the select circuit 16. In this manner, the translated external memory physical address can be provided to the external memory during the execution stage of the load instruction. As a result, the memory system is provided with an additional cycle to perform the memory access.

If the scan means 26 does not locate the register number identified in the load instruction in the physical address cache 14, the physical address cache 14 is then updated using the address generator 12 previously described. Since the tables 37 and 38 are accessed while the adder 34 is in the process of completing the computation of the new physical address, the external memory accessing system 10 can still provide the external memory 18 with the appropriate physical memory address in an efficient manner. As previously mentioned, the new translated external memory physical address is also conveyed to the physical address cache 14 to update the physical address cache 14 so that the updated entry may be reused as necessary. Hence, if the physical address cache 14 requires updating, there are two associative searches in the physical address cache on every cycle. One search is for a possible load and the other is for a possible address update.

As can be seen from the foregoing, the physical address cache is a fully-associative cache which is accessed by absolute register numbers. It stores the physical addresses and other information related to the translation. The cache incorporates a plurality of entries, for example, four entries, for containing physical addresses. The physical address cache thus contains a useful set of address translations for any loads which may be encountered in the instruction stream. The cache is searched during the decode of a load instruction. If the address register for the load has a valid translation in the cache, the address can appear at the external memory at the beginning of the execution stage of the load instruction. The physical address cache thus keeps a high fraction of useful translated addresses.

As can also be seen from the foregoing, an address can be updated in a register, requiring the contents of the physical address cache to be correspondingly updated during normal instruction execution. During the execution of any instruction, the physical address cache is searched by the scan means 26 for an entry associated with the destination register of the instruction. If the destination register has a translation in the cache, and if the associated address is successfully translated, the current entry is updated to reflect the new address. As previously mentioned, the updating requirement requires two associative searches in the physical address cache of every cycle. One search is for a possible load (read) and the other for a possible address update (write).

As can be further seen from the foregoing, the present invention provides early address generation by virtue of the adder 34 working in close conjunction with the address translation logic 36 and the tables 37 and 38. The adder 34 executes the computation of a new address by a small subset of instructions, as, for example, immediate loads and adds and subtracts with small displacements of, for example, 10 bits.

The address generator is implemented so that any address it computes has been translated by the end of the address computation. Specifically, the table entry select bits which it generates allow the accessing of the tables 37 and 38 to proceed in the first half cycle while remaining bits of the new address are computed. The address generator operates during the execute stage of every instruction. It updates translated addresses in the physical address cache and/or provides the external memory with a translated address directly. Hence, it exhibits a distinct advantage over prior art address generators which operate only during the execution of a load instruction.

From the foregoing, it can therefore be seen that the present invention provides a new and improved external memory accessing system. Because the system of the present invention utilizes register-indirect addressing, all address computations may be performed explicitly by instructions before a load is performed. As a result, a new address by an address computation is available to the external memory at the beginning of an execution of a load and can be used to improve the performance of the load. In addition, the physical address cache eliminates the penalty of address translation for loads that do not require address computation. Moreover, when address computation is required before a load instruction, the address may be computed when a load instruction is in the decode stage. Since the new address is computed during the decode stage of the load instruction, the new translated physical address may be available ahead of time instead of waiting on the execution of the load instruction to perform address translation so that the translated external memory physical address is still transmitted to the external memory at the beginning of the execute stage of the load instruction. The translated address is also placed into the physical address cache 14 for later reuse. This also allows an additional cycle for the memory access.

While a particular embodiment of the present invention has been shown and described, modifications may be made, and it is therefore intended to cover in the appended claims all such changes and modifications which fall within the true spirit and scope of the invention.

What is claimed is:

1. In a processor of the type which processes instructions in serial stages including a fetch stage, a decode stage, an execute stage, and a write-back stage, and which includes an external memory for storing data to be executed upon, said external memory including a plurality of storage locations with each said location having a unique physical storage address, and wherein said processor further includes a first plurality of registers, each said first plurality of registers having a unique address and being arranged for storing an untranslated address corresponding to one of said external memory locations, and a second plurality of registers, each said second plurality of registers having a unique address and being arranged for storing data to be executed upon by said processor, and wherein the addresses stored in said first plurality of registers require translation to said physical external memory location addresses to permit said external memory locations to be accessed, a new and improved system for efficiently accessing the data stored in one of said external memory locations and providing said data to one of said second plurality of registers responsive to a currently fetched load instruction including the address of one of said first plurality of registers, said system comprising:
- a physical address cache for storing a plurality of entries including the addresses of said first plurality of registers and the corresponding translated external memory address locations for those ones of said first plurality registers which were used for the execution of previous load instructions;
- means responsive to said currently fetched load instruction for determining, during said decode stage of said load instruction, if the address of said one of said first plurality of registers contained in said currently fetched load instruction is stored in said physical address cache; and
- means for conveying to said external memory at the beginning of said execution stage of said load instruction, the previously translated physical address of said memory location corresponding to said address of said one of said first plurality of registers if said address of said one of said first plurality of registers is contained in said physical address cache.

2. A system as defined in claim 1 further including update means for updating said entries of said physical address cache.

3. A system as defined in claim 2 wherein said update means is arranged to update said physical address cache when an address of one of said first plurality of registers contained in a load instruction is not located in said physical address cache.

4. A system as defined in claim 2 wherein said update means comprises an address generator coupled to said physical address cache for generating a new translated physical address associated with a corresponding one of said first plurality of registers pursuant to the execution of an address computation instruction prior to an immediately succeeding respective load instruction.

5. A system as defined in claim 4 wherein said address generator is coupled to said external memory for conveying to said external memory said new translated physical address prior to the execution stage of said immediately succeeding respective load instruction.

6. A system as defined in claim 5 wherein said address generator is arranged to convey said new translated physical address to said physical address cache with the address of said corresponding one of said first plurality of registers.

7. A system as defined in claim 4 wherein said address generator is arranged to compute a new physical address by arithmetically processing a base address and an offset address to derive a multiple-bit new virtual address.

8. A system as defined in claim 7 wherein said address generator includes a plurality of tables, each said table containing a plurality of external memory physical addresses, computing means for generating said multiple-bit virtual address, said computing means being arranged to provide said tables a first given number of said generated bits to derive from each said table one potential physical address while said computing means generates the other of said multiple bits, and translation means coupled to said computing means and to said tables for comparing said generated multiple-bit address to said potential physical addresses to determine which one of said potential physical addresses is said new translated physical address.

9. A system as defined in claim 8 wherein said translation means is coupled to said external memory for providing said external memory with said new translated physical address.

10. A system as defined in claim 9 wherein said translation means is further coupled to said physical address cache for providing said physical address cache with said new translated physical address.

11. A system as defined in claim 10 further including select means and wherein said physical address cache and said translation means are coupled to said external memory through said select means.

12. A system as defined in claim 8 wherein said computing means comprises an adder.

13. In a processor, an address generator, for generating a multiple-bit translated external memory physical address, responsive to a base address and an offset address, said address generator comprising:
- a plurality of tables, each said table containing a plurality of external memory physical addresses;
- computing means for arithmetically processing said base address and said offset address to generate a multiple-bit virtual address, said computing means being arranged to generate said multiple-bit virtual address and to provide said tables with a given number of first generated bits;
- said tables being responsive to said given number of first generated bits to derive from each said table one potential translated physical address while said computing means generates the other bits of said multiple-bit virtual address; and
- translation means coupled to said computing means and to each of said tables for comparing said generated multiple-bit virtual address to said potential translated physical addresses to determine which one of said potential translated physical addresses is said multiple-bit translated external memory physical address.

14. An address generator as defined in claim 13 wherein said plurality of tables comprises two tables.

15. An address generator as defined in claim 13 wherein said computing means comprises an adder.

16. An address generator as defined in claim 15 wherein said adder comprises a first input for receiving said base address and a second input for receiving said offset address.

17. An address generator as defined in claim 13 wherein said given number of first generated bits is five bits.

18. An address generator as defined in claim 13 wherein said computing means comprises a first output coupled to said tables for providing said tables said given number of first generated bits, and a second output coupled to said translation means for providing said translation means said other bits of said multiple-bit virtual address.

19. An address generator as defined in claim 18 wherein said translation means is arranged to use said other bits of said multiple-bit virtual address to determine which one of said potential translated physical addresses is said multiple-bit translated external memory physical address.

20. An address generator as defined in claim 19 wherein said multiple-bit translated external memory physical address comprises thirty-two bits.

* * * * *